R. MAW AND W. B. McLEAN.
SYSTEM OF OPERATING VEHICLES BY FLUID PRESSURE.
APPLICATION FILED MAY 29, 1914.

1,320,485. Patented Nov. 4, 1919.
3 SHEETS—SHEET 1.

Witnesses

Inventors
R. Maw
W. B. McLean
Their Attorney

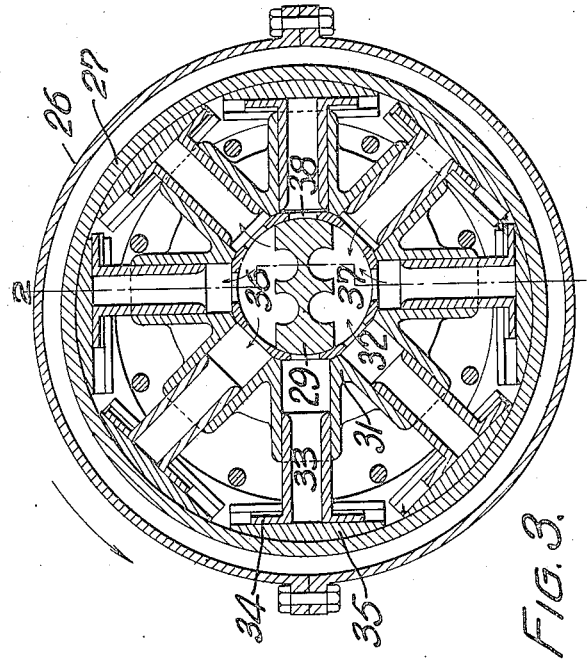

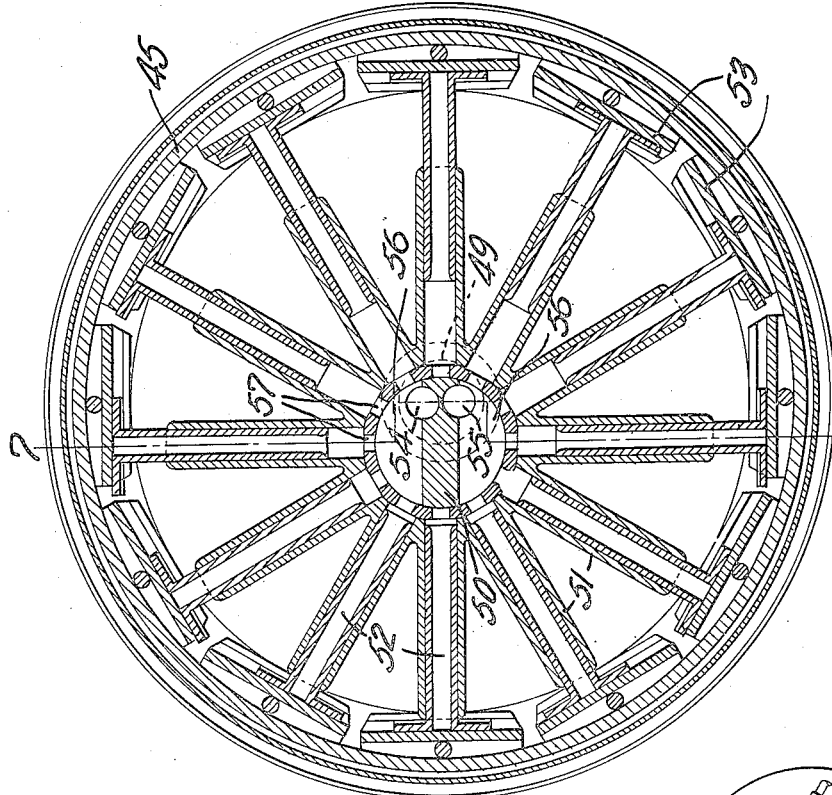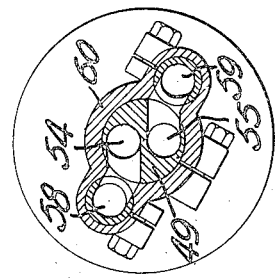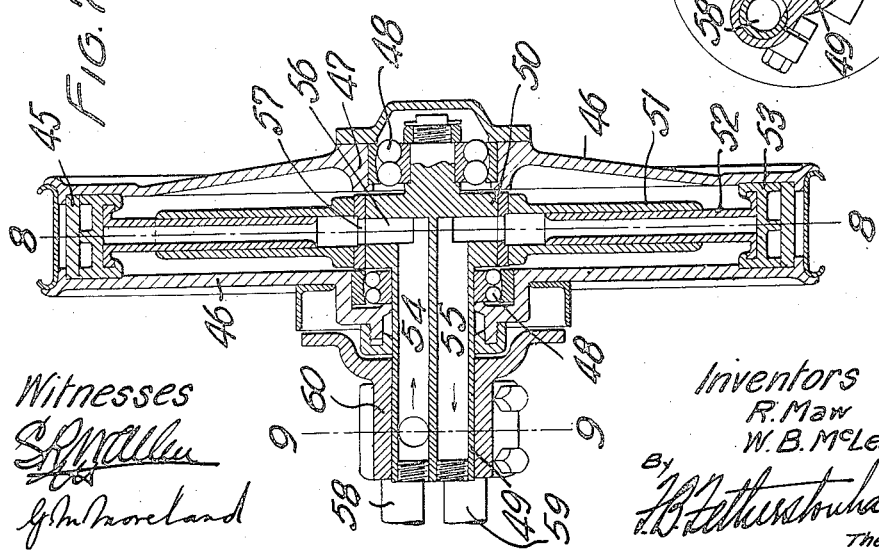

UNITED STATES PATENT OFFICE.

ROBERT MAW AND WILLIAM B. McLEAN, OF MONTREAL, QUEBEC, CANADA, ASSIGNOR, BY DIRECT AND MESNE ASSIGNMENTS, TO THE UNIVERSAL MACHINERY COMPANY, LIMITED, OF MONTREAL, CANADA.

SYSTEM OF OPERATING VEHICLES BY FLUID-PRESSURE.

1,320,485.  Specification of Letters Patent.  Patented Nov. 4, 1919.

Application filed May 29, 1914. Serial No. 841,867.

*To all whom it may concern:*

Be it known that we, ROBERT MAW and WILLIAM B. McLEAN, citizens of the Dominion of Canada, and residents of the city of Montreal, in the Province of Quebec and Dominion of Canada, have invented certain new and useful Improvements in Systems of Operating Vehicles by Fluid-Pressure, of which the following is a full, clear, and exact description.

This invention relates to improvements in liquid transmission systems of the type comprising a prime mover operating a pump delivering liquid to a motor, which in turn exhausts the liquid back to the intake of the pump.

The primary object of the invention is to provide a simple, durable and efficient apparatus arranged to deliver varying amounts of liquid per revolution which may be operated in either direction and either as a pump or as a motor.

A further object is to provide a simple and economical method of applying the power delivered by the transmission system to a wheeled vehicle such as an automobile.

Another object is to provide means for varying the speed of the motor without varying the speed of the prime mover and the pump.

Still another object is to provide in a liquid transmission system means for starting the prime mover, means for operating the motor independently as when coasting, and means for reversing the motor without correspondingly reversing the prime mover or pump.

The means for accomplishing the foregoing and other objects comprises essentially a prime mover connected to a variable stroke pump, which delivers liquid under pressure to a suitable motor or to a suitable high pressure tank, and draws liquid from the exhaust side of the motor or from a low pressure tank, so that a constant circulation of the same liquid is maintained. A cross over is provided in the connections between the pump and tanks, so that high pressure fluid may be passed through the pump to operate the same as a starting motor for the prime mover, when the same is an internal combustion motor or other mechanism requiring an initial revolution. Means are also provided for reversing the flow of liquid through the connections whereby the motor may be operated in either direction without changing the direction of revolution of the pump and prime mover, and also means for permitting a free circulation of the liquid through the motor without flow through the pump. The pump which is directly connected to the prime mover is arranged so that the stroke of its moving parts may be varied in order to produce a variation in the quantity of liquid circulated, while maintaining a uniform speed of revolution. The motor for convenience and direct application of power is built directly into the wheels.

In the drawings which illustrate the invention:—

Fig. 2 is a vertical longitudinal section of the pump.

Figure 1:
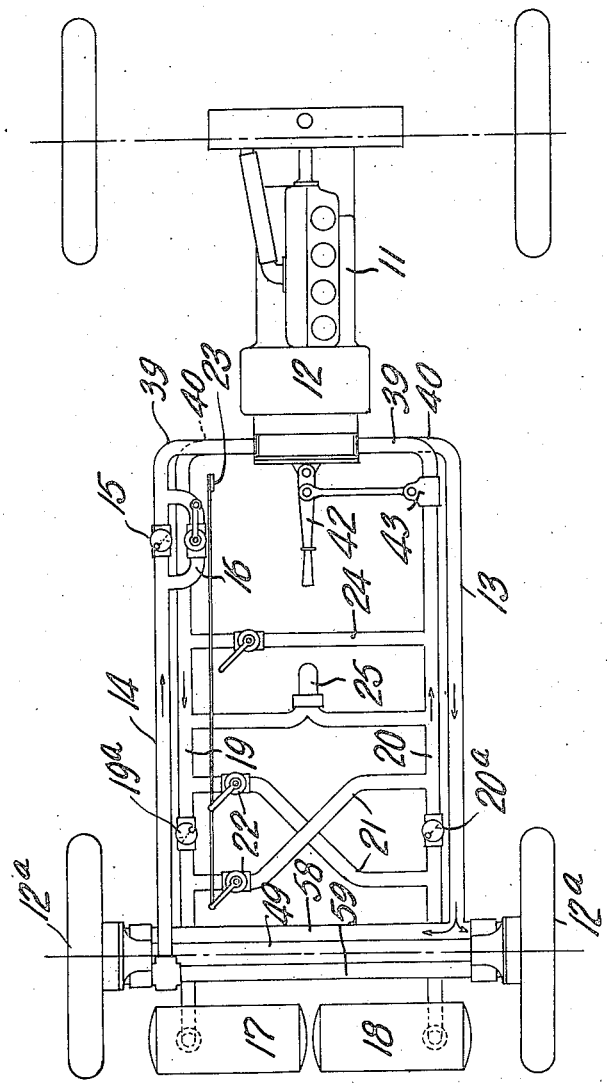
Figure 1 is a diagrammatic plan view showing the application of the system to an automobile.

Figs. 3, 4, 5 and 6 are sections on the lines 3—3, 4—4, 5—5 and 6—6 respectively of Fig. 2.

Fig. 7 is a vertical section through the center of a motor.

Figs. 8 and 9 are sections on the line 8—8, and 9—9 respectively, Fig. 7.

Referring more particularly to the drawings, 11 designates the prime mover which in the drawings is shown to be the internal combustion engine of an automobile, and 12 a liquid pump operated thereby and preferably direct connected thereto, so that the revolving members of the pump replace the fly wheel of the engine. The pump delivers liquid through pipe 13 to motors 12ª, which may be separate from or built into the wheels of the vehicle. The delivery from the pump is through the pipe 13, and after the liquid has passed through the motors, it is exhausted into the pipe 14 and returned to the intake of the pump 12. A check valve 15 is provided in this pipe to prevent reverse flow of the liquid, and a by-pass 16 is provided around the check valve in order that such reverse flow may be permitted when necessary, as for example, when the vehicle is being backed. A supply of liquid somewhat in excess of what is required for actual circulation is maintained in high and low pressure tanks 17 and 18 respectively, the pump being arranged to deliver into the high pressure tank through pipe 19 and draw from the low pressure tank through pipe 20. These pipes are provided with check valves 19ª and 20ª respectively, which prevent reverse flow of the fluid. As liquids are practically incompressible, it will be understood that these tanks normally contain air or other gas above the liquid, the pressure of which varies according to the amount of liquid forced into the tank, so that on occasion the expansion of the air above the liquid will drive the liquid out of the tank. This feature is utilized for driving the pump as a motor, so that the pump may be used as a starting device for the internal combustion motor 11. It is of course necessary that the pump should run in its normal direction. To obtain this result, cross over pipes 21 are provided between the pipes 19 and 20, each leading from the front of the check valve in one pipe to the rear of the check valve in the other pipe, as clearly shown. These cross over pipes are provided with valves 22 simultaneously operable by means of a lever 23 conveniently located. It is customary when traveling down hill in automobiles or other power vehicles to stop the prime mover for the purpose of saving fuel. In the present arrangement, stopping of the prime mover produces a stopping of the pump, so that the oil will not be circulated thereby. As, however, the wheels continue to revolve and produce movement of the motors therein, these motors will operate as pumps, and it is therefore necessary to provide a means for freely circulating the liquid. This means consists of a by-pass pipe 24 which short circuits the pump in so far as the motors are concerned and permits a free flow of the liquid between the intake and exhaust of the motors. As a precaution, a relief valve 25 may be provided which will permit the escape of the transmission liquid from the delivery to the intake side of the pump, if the resistance to the operation of the pump or motors should be so great as to cause dangerously high pressures.

The variable stroke pump, which is the most important element of the system, comprises a fixed casing 26 containing a casing 27 direct connected to the shaft 28 of the prime mover 11, and revolubly mounted on a central shaft 29 by means of ball bearings 30. The central shaft 29 is held against revolution, but is permitted a lateral sliding movement, so that it can be moved from a position concentric with the casing 27 to eccentric positions on either side of the center thereof. The shaft 29 carries revolubly mounted thereon within the casing 27 a cylinder member 31 having a plurality of bores 32 arranged radially of the shaft 29. Each cylinder is provided with a piston 33 having at the outer end thereof an enlarged flange or shoe 34 slidable in a guide 35, fixed within the casing 27 and arranged perpendicular to the radii thereof. The shaft 29 is hollowed out to provide inlet and outlet passages 36 and 37 arranged to each connect with an equal number of cylinders at one time. These passages are obviously spaced sufficiently apart to prevent both passages coming into communication with a single cylinder. Ports 38 are provided at the inner ends of the cylinders, and as the cylinder member revolves, are brought alternately into communication with the inlet and outlet passages. The suction and discharge pipes 39 and 40 of the pump are connected to the shaft 29 at right angles thereto, as clearly shown in Figs. 2 and 4, and are rigidly connected to the shaft by a clamp 41. A control lever 42 conveniently located on the vehicle is connected to one or both of these pipes by a clamp 43 (Fig. 1), so that by operating the lever, the pipes may be shifted to produce bodily lateral movement of the shaft 29. This movement controls the amount of eccentricity of the shaft with respect to the revoluble casing 27, and also the position of the shaft center to one side or the other of the casing center.

It will be readily understood that if the shaft is moved into position concentric with the casing, there will be no relative movement between the cylinders carried by the shaft, and the pistons carried by the casing, so that no flow of liquid will result. If, however, the shaft is moved to eccentric position, reciprocating movement between the cylinders and pistons will be produced by the rotation of the casing, thus causing the liquid to be drawn into the cylinders on one side of the shaft and expelled from the cylinders on the opposite side. Assuming the relation of the parts for revolution in a positive direction to be as shown in Fig. 3, it is very clear that if the shaft 29 be shifted from the right of the casing center to the left, the cylinders shown as drawing in liquid will immediately commence to expel liquid and vice versa, without any change in the direction of rotation of the casing. This reverse direction of liquid flow will obviously operate the motors connected thereto in the reverse direction. As check valve 15 normally prevents reverse (or pressure) flow through the pipe 39, by-pass 16 is provided with a manual control valve whereby valve 15 may be shunted and reverse flow through pipe 39 thereby permitted, for the purpose described.

The motors 12ª, which drive the vehicle, may be located and arranged in any suitable manner, but it is preferred to use a motor built into and forming a part of the driving wheels, as by this means the power is applied directly to the wheel and not through intermediate mechanism. The motors, which are shown in Figs. 7 to 9 inclusive, each include a felly 45 connected by plates or spokes 46 to a hub 47, which revolves on ball bearings 48 on a fixed shaft 49. The extremity of the shaft 49 within the wheel is provided with a fixed eccentrically disposed portion 50, which being eccentric to the shaft is also eccentric to the felly of the wheel. This eccentric 50 carries a revoluble cylinder member 51 containing reciprocating pistons 52 mounted at their outer ends in guides 53 fixed to the felly 45, in exactly the same manner as already described in connection with the pistons and guides of the pump. The ends of the shaft are hollowed out to provide inlet and outlet passages 54 and 55 respectively for the motive fluid, which flows through ports 56 in the eccentric and ports 57 in the cylinder member. The supply and exhaust pipes 58 and 59 respectively are secured to the shaft by means of a suitable clamp 60, and preferably extend parallel with the shaft 49 from wheel to wheel.

When the motive fluid is supplied to the motor, under pressure, it presses in opposite directions against the cylinders and pistons in the well known manner and forces same apart, which longitudinal movement is transferred by reason of the eccentricity of the felly carrying the pistons and shaft carrying the cylinders into a rotary movement of the felly, so that the vehicle is caused to travel.

If the cylinders normally expelling liquid receive same under pressure and the cylinders receiving liquid under pressure have the liquid drawn away from them by suction, it is obvious that the motor will operate in a reverse direction. Thus, reversal of direction of the liquid flow caused by shifting the shaft of the pump from one side to the other of the casing center will produce revolution of the motors in a reverse direction, while the pump continues to revolve in the same direction. As will be readily seen from Fig. 1 and Fig. 2, the intake pipe 36 of the pump is connected to the exhaust pipe 59 of the motors from the pipe 14 at one end, and at the other end to the pipe 20 from the low pressure tank while the discharge pipe 37 of the pump is connected at one end to the supply pipe 58 of the motors through the pipe 13 and at the opposite end through the pipe 19 to the high pressure tank 17. Thus, when the vehicle is running, the liquid will circulate through the pump and motors, while the liquid in the tanks and other connections will remain substantially immobile. When the cross over pipes 21 are utilized, the high pressure fluid is delivered to the intake pipe 36 of the pump, which then becomes a motor and imparts initial revolution to the prime mover 11. That is, liquid from tank 17 is expelled to and through pipe 20 and into the pump, which is thereby rotated, and the liquid thence expelled through pipe 19 by way of the cross-over to pipe 20 in rear of check valve 20ª, and so to the low pressure tank 18. When the vehicle is running with the prime mover and pump stopped, the exhaust from the wheel motors circulate through the pipes 14, 39 and 20 to the pipe 24, and then through the pipes 19, 40 and 13 back to the intake of the motors, so that the liquid circulates freely and the operation of the motors does not act as a brake on the vehicle. It will be seen that pipes 39, 40 are continuous through the pump and that the flow passages 36 and 37 of the pump are merely tapped off these pipes, so that the liquid merely flows past the pump and not through it. When the pump is not running, the liquid in the pipes 13, 14, 19 and 20 between the pump and the by-pass pipe 24 is stagnant and will therefore move without resistance in whatever direction it is impelled by the discharge of the wheel motors. If, however, the by-pass 24 be partly closed, the circulation of liquid will be impeded so that the motors will operate against resistance and hence produce a certain braking effect on the vehicle.

Certain of the subject-matter shown in the accompanying drawings and described in the preceding specification is claimed more specifically in the copending applications, filed May 29, 1914, Serial Nos. 841,968 and 841,969.

Having thus described our invention, what we claim is:

1. A device of the character described, comprising the combination with a vehicle and a prime mover therein, of a pump driven by said prime mover, motors connected to the wheels of said vehicle, conduits connecting said pump and motors for the supply and return of fluid, and means for stopping the vehicle including high and low pressure reservoirs and means for connecting the high pressure reservoir with the discharge side of the wheel motors and the low pressure reservoir with the intake side of the wheel motors.

2. In an automobile, the combination with the driving wheels and engine, of a liquid pump direct connected to the engine, motors direct connected to the wheels, a conduit connecting the discharge side of the pump with the supply side of the motors, a conduit connecting the exhaust side of the motors with the suction side of the pump, a high pressure tank and a low pressure tank, a conduit connecting the high pressure tank with the discharge side of the pump, a conduit connecting the low pressure tank with the suction side of the pump, check valves controlling the direction of liquid circulation in said conduits, and cross over connections by-passing the check valves between said tank conduits arranged to connect the high pressure tank with the suction side of the pump and the low pressure tank with the discharge side of the pump.

3. In an automobile, the combination with the driving wheels and engine, of a liquid pump direct connected to the engine, motors direct connected to the wheels, a conduit connecting the discharge side of the pump with the supply side of the motors, a conduit connecting the exhaust side of the motors with the suction side of the pump, a high pressure tank and a low pressure tank, a conduit connecting the high pressure tank with the discharge side of the pump, a conduit connecting the low pressure tank with the suction side of the pump, check valves controlling the direction of liquid circulation in said conduits, and a cross over connection between said tank conduits located between the pump and check valves and arranged to connect the suction and discharge sides of the pump.

4. In an automobile, the combination with the driving wheels and engine, of a liquid pump direct connected to the engine, motors direct connected to the wheels, a conduit connecting the discharge side of the pump with the supply side of the motors, a conduit connecting the exhaust side of the motors with the suction side of the pump, a high pressure tank and a low presure tank, a conduit connecting the high pressure tank with the discharge side of the pump, a conduit connecting the low pressure tank with the suction side of the pump, check valves controlling the direction of liquid circulation in said conduits, and means for reversing the direction of vehicular movement including a by-pass conduit arranged to establish liquid flow in a reverse direction between the pump and motors.

5. In an automobile, the combination with the driving wheels and engine, of a liquid pump direct connected to the engine, motors direct connected to the wheels, a conduit connecting the discharge side of the pump with the supply side of the motors, a conduit connecting the exhaust side of the motors with the suction side of the pump, a high pressure tank and a low pressure tank, a conduit connecting the high pressure tank with the discharge side of the pump, a conduit connecting the low pressure tank with the suction side of the pump, check valves controlling the direction of liquid circulation in said conduits, cross over connections by-passing the check valves between said tank conduits arranged to connect the high pressure tank with the suction side of the pump and the low pressure tank with the discharge side of the pump, and a cross over connection between said tank conduits located between the pump and check valves and arranged to connect the suction and discharge sides of the pump.

6. In a vehicle, the combination with the running wheels and an engine carried by the vehicle, of a liquid pump direct connected to the engine, motors direct connected to the wheels, a conduit connecting the discharge side of the pump with the supply side of the motors, a conduit connecting the exhaust side of the motors with the suction side of the pump, a high pressure tank and a low pressure tank, a conduit connecting the high pressure tank with the discharge side of the pump, a conduit connecting the low pressure tank with the suction side of the pump, check valves controlling the direction of liquid circulation in said conduits, means for varying the speed and direction of travel of the vehicle from nothing to maximum in either direction without varying the speed or direction of rotation of the engine, including means for shifting the pump axis relatively to its axis of rotation, and a by-pass conduit arranged to establish a reverse flow of liquid between the pump and motors.

In witness whereof, we have hereunto set our hands in the presence of two witnesses.

ROBERT MAW.
WILLIAM B. McLEAN.

Witnesses:
S. R. W. ALLEN,
G. M. MORELAND.